United States Patent Office 3,463,050
Patented Aug. 26, 1969

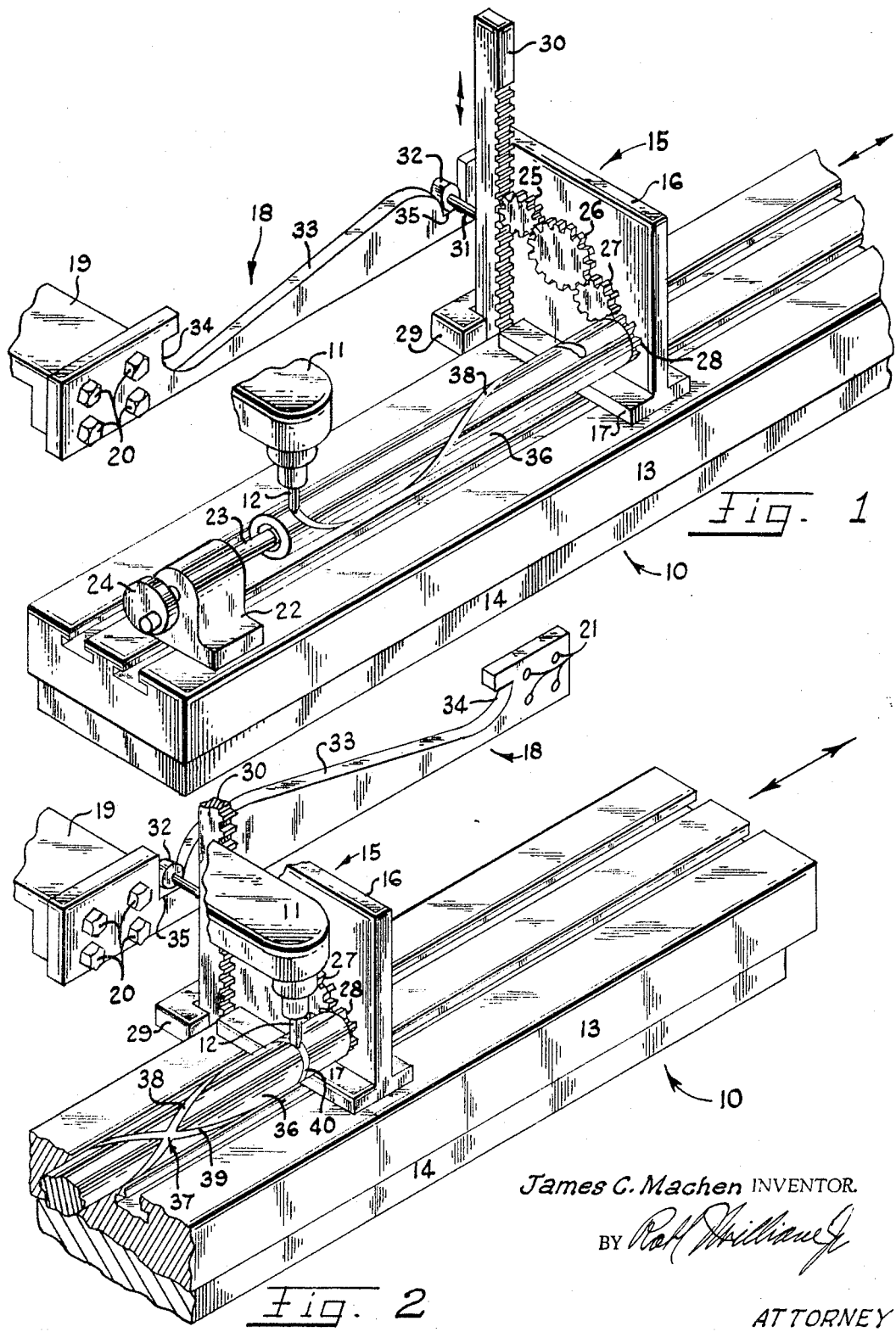

3,463,050
APPARATUS FOR CUTTING A VARIABLE OR CONSTANT LEAD ON A MILLING MACHINE
James C. Machen, Huntsville, Ala., assignor to Thiokol Chemical Corporation, Bristol, Pa., a corporation of Delaware
Filed Oct. 30, 1967, Ser. No. 678,911
Int. Cl. B23c *1/18*
U.S. Cl. 90—11.62          5 Claims

ABSTRACT OF THE DISCLOSURE

An apparatus for cuting a helical groove in a cylindrical cam so that the cam can be used as a variable or constant lead for the milling machine in future applications to material in which a desired configuration must be reproduced by the milling machine.

BACKGROUND OF THE INVENTION

Field of the Invention

The preparation of cylindrical cams, having helical grooves therein, which are to be later used for leads for milling machines are well known, but the art of producing a cylindrical cam, having a helical groove therein, by a milling machine with which the cylindrical cam is to be later used, has not been previously known.

The present invention is utilized, therefore, to produce a cylindrical cam, having a helical groove therein that is cut in a precise and accurate manner by a milling machine that will later employ the cylindrical cam as a constant or variable lead for the milling machine on which it is produced.

Description of the prior art

Many types of cutting machines have been employed to prepare cylindrical cams, having helical grooves therein. Various arrangements of guides, etc., have been used to prepare such cylindrical cams, but such cutting machines do not prepare the cylindrical cams so that they can be later used with the cutting machine, as the present invention is utilized to produce the cylindrical cams on a milling machine and later utilize the same cylindrical cam as a variable or constant lead for the same milling machine by which it was produced.

SUMMARY OF THE INVENTION

This invention, therefore, relates to improvements in apparatus that will be utilized to cut a helical groove in a cylindrical cam, by the use of a milling machine that will later employ the cylindrical cam as a variable or constant lead in controlling the operation of the milling machine in performing milling operations on material in which it is desired to provide an accurate and precise configuration.

It is a well-known fact that cutting tools are used for one or more of three purposes: Material removal, dimensional or size accuracy and surface refinement; in some instances one of these considerations is of primary importance and the others are or must be, disregarded; in other cases all three must be considered. In the present invention the accuracy with which the material is removed to provide an efficient helical guide groove, is of primary importance, since it is the helical guide groove which determines the lead on the milling machine. Therefore, when the helical guide groove is machined in a cylindrical cam with the aid of the present invention, it is understood that the helical guide groove will provide both a constant and a variable lead for the milling machine, thus the material removed must be cut away with accuracy and precision, as previously stated.

The cutter utilized to provide the helical guide groove is a single-point cutter and the cutting speed of the cutter is the velocity, usually in inches or feet per minute, with which the cutter passes over the work. The apparatus embodying the invention, therefore, must by its structure determine the velocity of the cutter so that the helical guide groove is cut with precision and accuracy. The rate of travel of the bed of the milling machine must also be regulated so that the velocity with which the helical guide groove is cut and the velocity with which the cylindrical cam is fed to the cutter is uniform and in direct proportion to each other during the cutting of the helical guide groove.

Since cams, by their peculiar formation, impart a desired motion or series of motions to another member, it is a necessary requirement that helical guide grooves in a cylindrical cam that imparts such motion be accurate and without variations, that would cause damage to the material which is being milled, when the cylindrical cam is being utilized as a variable or constant lead for the milling machine. It is a matter of fact that a cylindrical cam controls a follower so that as it moves in a plane parallel to the axis of the cylindrical cam, it is controlled by the helical guide groove; therefore, if the helical guide groove has not been cut with precision in the cylindrical cam, poor results will accomplish the use of a cylindrical cam that does possess these characteristics. Thus the apparatus embodying the invention must at all times be under such control that the helical guide groove cut by the use of the apparatus, must meet very rigid specifications and requirements.

It is an object of this invention to provide an apparatus that, when used in conjunction with a milling machine, will cut a helical guide groove in a cylindrical cam with precision and accuracy.

With the above and other objects and advantages in view that will appear as the description of the invention proceeds, it will be understood that the invention consists of the novel details and arrangement of parts, that are illustrated in the accompanying drawing in which:

BRIEF DESCRIPTION OF THE DRAWING

FIGURE 1 is a perspective view, partly broken away, illustrating the manner in which the embodiment of the invention is mounted on a milling machine and also illustrating the manner in which one helix of the helical guide groove is produced in a cylindrical cam; and FIGURE 2 is a similar view to FIGURE 1, showing the manner in which the changeover betwen the helixes is accomplished.

DESCRIPTION OF THE PREFERRED EMBODIMENT

Referring more in detail to the drawing, wherein like parts are designated by like reference numerials, the reference numeral 10 is used to designate a Bridgeport vertical head milling machine with which the apparatus embodying the invention will be used, as will be later described.

The milling machine 10 is of conventional design and only the parts thereof that are necessary to illustrate the manner of use of the invention have been included in the drawing.

The milling machine 10, as illustrated in part, comprises a vertical head 11 in which is mounted a single point cutter 12. The milling machine 10 also includes a table or bed 13 which is mounted on a saddle 14, it being understood that the saddle 14 is mounted for reciprocal longitudinal movement in a saddle slide on the knee of the milling machine 10.

The apparatus embodying the invention comprises a T-shaped mounting plate 15 that includes a vertical standard 16 and a horizontal base 17, a reversible guide 18 that is secured to one end of a horizontally disposed L-shaped supporting bar 19 by bolts 20 that extend through openings 21, which are provided at opposite ends of the guide 18. The opposite end of the bar 19 being rigidly secured to the vertically disposed column of the milling machine 10 in any conventional manner and an internally threaded base member 22 in which is threadably mounted a screw member 23, the rotation of which is controlled by a small hand wheel 24.

The standard 16 of the mounting plate 15 has a plurality of interengaging spur gears 25, 26, 27 and 28 that are mounted for rotation thereon and the base 17 has formed integral therewith, at one end edge thereof, a U-shaped guide formation 29. The guide formation 29 is adapted to receive for sliding movement therein a vertically disposed rack bar 30 that has operational interengagement with the spur gear 25 that is mounted for rotation on the standard 16 of the mounting plate 15.

Extending at right angles to the rear surface of the rack bar 30 and rigidly secured thereto, is a spindle 31 on which at the outer end thereof is rotably mounted a roller 32. The roller 32 engages the upper edge of the guide 18 which provides a track 33 for the roller and the contour of the track 33 is identical with the configuration that is to be cut in the cylindrical cam. The forward edge of the track 33 terminates in a first socket or pocket 34, that is formed in the guide 18 and the opposite or rear end of the track 33 terminates in a second socket or pocket 35.

The gear 28 is provided at the center thereof with a right angularly tang (not shown) that extends into one end of a cylindrical cam 36 and the opposite end of the cylindrical cam 36 is adapted to receive the end of the screw member 23 and when the hand wheel 24 is manipulated, the tang and the end of the screw member 23 retain the cam 36 in position so that the cutter 12 can cut a helical guide groove 37 in the cylindrical cam 36.

In the operation of cutting the helical guide groove 37, the guide 18 is mounted, as shown in FIGURE 1, to permit the cutter 12 to cut the helix 38. When the terminal end of the helix 38 is reached, as in FIGURE 1, the operation of the milling machine 10 is halted and the guide 18 is reversed, as shown in FIGURE 2 and the helix 39 is then cut in the cylindrical cam 36 by the cutter 12 when the table or bed 13 is moved in the opposite direction.

To start cutting the helical guide groove 37 in the cylindrical cam 36, the base 17 of the mounting plate 15 is rigidly secured to the table or bed 13 so that as the table or bed 13 moves, the mounting plate 15 will move simultaneously with the table or bed 13.

At the start the table or bed 13 moves forwardly, so that as the roller 32 moves forwardly along the track 33, the rack 30 will move vertically and being engaged with the gear 25, it will cause the gears 25, 26, 27 and 28 to rotate and thus cause the cylindrical cam 36 to rotate so that the cutter 12 will cut the helix 38 in the cylindrical cam 36. It is also pointed out that in FIGURES 1 and 2 the pitch diameter of gear 28 is equal to the outside diameter of the cam 36, providing a 1 and 1 ratio of travel of the roller 32 and the rotation of the cam 36, however, if it is desired to change the contour of the track 33 to cut a different form of helix 38, the diameter of the gear 28 may be reduced to ½ the outside diameter of the cam 36 to provide a 2 to 1 ratio of travel of the roller 32 and the rotation of the cam 36. Therefore, the size of the gears 25, 26, 27 and 28 are so proportioned, the contour of the track 33 so conformed and the ratio of travel of the roller 32 and the rotation of the cam 36 so arranged that the shape of the helix 38 will be identical with the contour of the track 33.

When, as previously stated, the terminus of the helix 38 is reached, the travel of the table or bed 13 will be halted and the guide 18 reversed, as in FIGURE 2, at which time the travel of the table or bed 13 will also be reversed and the helix 39 will be cut as in FIGURE 2. It being understood that the terminal ends of the helixes 38 and 39 will both terminate in a circular groove 40, as shown in FIGURE 2.

Thus, by reversing the guide 18 and reversing the travel of the table or bed 13, the helical guide groove 37 will be cut by the cutter 12 in the cylindrical cam 36. It also being understood that a rearrangement of the gears 25, 26, 27 and 28 may also be made so that the guide 18 does not have to be reversed as described.

It is believed that from the foregoing description, the mode of operation of the apparatus embodying the invention will be clear to one skilled in the art, and it is to be understood that variations in the mode of operation, as well as the assembly of parts constituting the invention may be adhered to providing such alterations fall within the spirit of the invention and the scope of the appended claims.

Having thus described the invention, what is claimed as new and desired to be secured by Letters Patent is:

1. The combination with a milling machine of an apparatus for controlling the cutting of a helical guide groove in a cylindrical cam, comprising a mounting plate, a plurality of interengaging gears mounted for rotation on said mounting plate, a vertically disposed vertically movable rack bar mounted for sliding movement on said mounting plate for engagement with one of said gears, a roller mounted on said rack bar, a guide having a track on the upper edge thereof conforming to the contour of one helix of the helical guide groove mounted on said milling machine so that as the milling machine is operated the roller will engage the track on said guide to control the rotation of the cylindrical cam and the cut of the helical guide groove in said cylindrical cam.

2. The combination as in claim 1, wherein means is mounted on said milling machine to retain said cylindrical cam in engagement with one of said gears not engaged by said rack bar.

3. The combination as in claim 1, wherein means is provided for reversibly mounting said guide on said milling machine.

4. The combination as in claim 1, wherein sockets are provided in said guide to limit the travel of said roller on the track on said guide.

5. The combination as in claim 2, wherein the diameter of said one of said gears is equal to the outside diameter of said cam to provide a 1 to 1 ratio of travel for said roller and the rotation of said cam.

References Cited

UNITED STATES PATENTS

| 320,968 | 6/1885 | Richards | 90—11.5 |
| 2,104,267 | 1/1938 | Melin | 90—11.62 X |

ANDREW R. JUHASZ, Primary Examiner

GIL WEIDENFELD, Assistant Examiner

U.S. Cl. X.R.

90—13